United States Patent
Sonoda et al.

(10) Patent No.: US 9,641,508 B2
(45) Date of Patent: ***May 2, 2017

(54) INFORMATION PROCESSING APPARATUS, INFORMATION PROCESSING METHOD, AND COMPUTER-READABLE RECORDING MEDIUM

(71) Applicant: SONY CORPORATION, Tokyo (JP)

(72) Inventors: Shuhei Sonoda, Kanagawa (JP);
Tsutomu Kawachi, Tokyo (JP);
Masayuki Takada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/677,694

(22) Filed: Apr. 2, 2015

(65) Prior Publication Data

US 2015/0215306 A1  Jul. 30, 2015

Related U.S. Application Data

(63) Continuation of application No. 12/977,436, filed on Dec. 23, 2010, now Pat. No. 9,065,871.

(30) Foreign Application Priority Data

Feb. 18, 2010  (JP) ................................. 2010-033550

(51) Int. Cl.
  *G06F 15/16*  (2006.01)
  *H04L 29/06*  (2006.01)
  *H04L 29/08*  (2006.01)

(52) U.S. Cl.
  CPC .......... *H04L 63/08* (2013.01); *H04L 63/0815* (2013.01); *H04L 67/10* (2013.01);
  (Continued)

(58) Field of Classification Search
  None
  See application file for complete search history.

(56) References Cited

U.S. PATENT DOCUMENTS

| 6,546,464 B2 * | 4/2003 | Fortuna ............... G06F 12/0837 711/124 |
| 8,370,957 B2 | 2/2013 | Kim et al. |

(Continued)

FOREIGN PATENT DOCUMENTS

| JP | 2001-184286 A | 7/2001 |
| JP | 2003-283490 A | 10/2003 |

(Continued)

OTHER PUBLICATIONS

Japanese Office Action issued Jul. 14, 2015 in Patent Application No. 2014-10327 (without English Translation).

(Continued)

*Primary Examiner* — Farid Homayounmehr
*Assistant Examiner* — Olanrewaju Bucknor
(74) *Attorney, Agent, or Firm* — Oblon, McClelland, Maier & Neustadt, L.L.P.

(57) ABSTRACT

An information processing apparatus according to the present invention is arranged in a client terminal connected to a server storing data via a network, wherein the information processing apparatus receives requests from one or a plurality of applications in the client terminal and controls transmission and reception of information to/from the server. The information processing apparatus includes an authentication information storage unit for storing authentication information of a user for accessing the server, and a request transmission unit for attaching the authentication information of the user of the client terminal to a request based on the request given by the application of the client terminal, and transmits the request to the server.

12 Claims, 18 Drawing Sheets

(52) U.S. Cl.
CPC ...... *H04L 67/2833* (2013.01); *H04L 67/2852* (2013.01); *H04L 67/322* (2013.01)

(56) References Cited

U.S. PATENT DOCUMENTS

| | | | |
|---|---|---|---|
| 8,532,007 B2* | 9/2013 | Araki | H04L 12/66 370/252 |
| 8,782,760 B2 | 7/2014 | Kamakura | |
| 2003/0115327 A1 | 6/2003 | Kokado et al. | |
| 2005/0278527 A1 | 12/2005 | Liao et al. | |
| 2006/0224051 A1* | 10/2006 | Teller | A61B 5/02055 600/300 |
| 2006/0224783 A1 | 10/2006 | Sakoh et al. | |
| 2008/0022356 A1* | 1/2008 | Tanaka | H04L 9/0891 726/1 |
| 2008/0081580 A1 | 4/2008 | Cole | |
| 2008/0159232 A1 | 7/2008 | Thalanany et al. | |
| 2009/0028527 A1* | 1/2009 | Jang | H04N 5/23293 386/224 |
| 2009/0287831 A1* | 11/2009 | Nakagawa | H04L 63/08 709/228 |
| 2010/0100952 A1 | 4/2010 | Sample et al. | |
| 2010/0106345 A1* | 4/2010 | Hwang | G07C 5/0816 701/2 |
| 2010/0115584 A1 | 5/2010 | Gotou | |
| 2010/0257595 A1* | 10/2010 | Nakagawa | G06F 21/33 726/6 |
| 2011/0178745 A1* | 7/2011 | Kobayashi | G01R 31/3682 702/63 |

FOREIGN PATENT DOCUMENTS

| | | |
|---|---|---|
| JP | 2004-126908 A | 4/2004 |
| JP | 2005-11098 A | 1/2005 |
| JP | 2007-272618 | 10/2007 |
| JP | 2008-015716 A | 1/2008 |
| JP | 2008-263548 | 10/2008 |
| JP | 2009-218631 | 9/2009 |
| WO | 2008082769 A1 | 7/2008 |

OTHER PUBLICATIONS

Office Action issued Mar. 11, 2014 in Japanese Patent Application No. 2010-033550.
Office Action issued Nov. 4, 2014 in Chinese Patent Application No. 201110037645.9 (with English translation).
Office Action issued Nov. 24, 2015, in Japanese Patent Application No. 2010-033550.

* cited by examiner

FIG. 4

| REQUEST XML(OR ID) | REQUEST ID |
|---|---|
| <component><component>api6</component><param><arg1... | xxxxxxx3 |
| <component><component>api7</component><param><arg1... | xxxxxxx7 |

| REQUEST XML | RESPONSE XML | EXPIRATION DATE |
|---|---|---|
| <component><component>api4</c... | <param><total><22></total><file><id><fsfi8ir... | 200910300930 |
| <component><component>api5</c... | <param><total><5></total><file><id><idsw... | 200910301200 |

| QUEUE INDEX | APPLICATION ID | PRIORITY DEGREE | REQUEST XML(OR ID) |
|---|---|---|---|
| 1 | A | -1 | <component><component>api1</component><param><arg1... |
| 2 | B | 0 | xxxxxx3 |
| 3 | C | -1 | <component><component>api2</component><param><arg1... |
| 4 | D | 1 | <component><component>api3</component><param><arg1... |

| 1461 | 1462 | 1463 | 1464 |
|---|---|---|---|
| USER ID | CLIENT ID | PASSWORD | SERVER URL |
| UserB | 000030001-1234 | Kdj3ajdak8d | https://jm1.server.com/userB/xxxx... |

FIG. 12

```
<server>
  <component>
    <component>api1</component>  } NAME OF EXECUTED API
    <param>
      <arg1>x</arg1>  } ARGUMENT OF EXECUTED API
    </param>
  </component>
</server>
```

FIG. 13

```
<server>
  <component>
    <component>api2</component>  } NAME OF EXECUTED API
    <param>
      <arg1>y</arg1>
      <arg2>z</arg2>  } ARGUMENT OF EXECUTED API
    </param>
  </component>
</server>U
```

FIG. 16

```
<server>
  <component>
    <code>0</code>  } WHETHER REQUESTED API IS
                      SUCCESSFULLY EXECUTED OR NOT
    <param>
      <result3>ooooooooc</result3>  } EXECUTION RESULT
    </param>
  </component>
</server>
```

FIG. 17

```
<server>
  <component>
    <code>0</code>  } WHETHER API REQUESTED FIRST IS
                      SUCCESSFULLY EXECUTED OR NOT
    <param>
      <result1>ooooooooa</result1>  }
      <result2>ooooooob</result2>  } EXECUTION RESULT OF FIRST API
    </param>
  </component>
  <component>
    <code>0</code>  } WHETHER API REQUESTED SECOND IS
                      SUCCESSFULLY EXECUTED OR NOT
    <param>
      <result3>ooooooooc</result3>  } EXECUTION RESULT OF
                                      SECOND API
    </param>
  </component>
</server>
```

FIG. 18

```
<server>
  <component>
    <code>0</code>
    <cache>200910300930</cache>  } CACHE EXPIRATION DATE
    <param>
      <result1>ooooooood</result1>
      <result2>oooooooe</result2>
    </param>
  </component>
</server>
```

FIG. 19

```
<server>
  <component>
    <code>0</code>
    <requestID>xxxxxxx3</requestID>  } SPECIFICATION OF REQUEST ID
    <param>
      <result1>ooooooood</result1>
      <result2>oooooooe</result2>
    </param>
  </component>
</server>
```

FIG. 20

| USER ID | CLIENT ID | PASSWORD | SERVER URL | LOGIN |
|---|---|---|---|---|
| UserA | 000030001-5678 | Jfa3jasdi78 | https://jm1.server.com/userA/xxxx... | Off |
| UserB | 000030001-1234 | Kdj3ajdak8d | https://jm1.server.com/userB/xxxx... | On |

1461  1462  1463  1464  1465

INFORMATION PROCESSING APPARATUS, INFORMATION PROCESSING METHOD, AND COMPUTER-READABLE RECORDING MEDIUM

CROSS-REFERENCE TO RELATED APPLICATIONS

This application is a continuation application of U.S. application Ser. No. 12/977,436 filed Dec. 23, 2010, which claims priority to Japanese Application No. 2010-033550 filed Feb. 18, 2010. U.S. application Ser. No. 12/977,436 is herein incorporated by reference in its entirety for all purposes.

BACKGROUND OF THE INVENTION

Field of the Invention

The present invention relates to an information processing apparatus, an information processing method, and a computer-readable recording medium.

Description of the Related Art

Recently, a mobile information terminal allowing each user to customize a system by adding an application in a manner similar to a personal computer has been attracting a great deal of attention. In this case, examples of applications include those developed by third venders. On the other hand, each application and a server become more closely dependent on each other, and in many cases, one client may include multiple types of applications executing processings using the server.

When a server and an application use authentication information of each user and cooperate with each other, it is necessary for each application to prompt a user to input authentication information and store the authentication information to achieve a single sign-in. However, this operation is nothing but cumbersome for the user. Moreover, there is an issue in that the server has a larger region for storing the authentication information, and there is also a security issue in that the authentication information of the server is given to third venders. Further, it is inefficient for each application to separately communicate with the same server, and this may increase the communication cost and the load of the server and may affect the battery life of the client terminal.

For example, a method for reducing the communication cost and the load of the server is disclosed in Japanese Patent Application Laid-Open No. 2009-218631. In this communication control method, a gateway apparatus is arranged in a network, and the gateway apparatus collects session control messages from clients, generates new messages, and transmits the new messages to a server, thus reducing session resources.

SUMMARY OF THE INVENTION

However, it is effective to arrange the gateway apparatus between the client and the server as disclosed in Japanese Patent Application Laid-Open No. 2009-218631 Even in this configuration, however, each application of the client has to separately communicate with the server, which results in an issue in that this configuration does not reduce the communication traffic transmitted from the client. This communication traffic transmitted from the client affects the memory and the battery of the terminal, the communication cost of the user, and the like.

In view of the foregoing, it is desirable to provide a novel and improved information processing apparatus, information processing method, and computer-readable recording medium, capable of controlling transmission and reception of information between a client and a server and reducing the communication traffic between the client and the server.

According to an embodiment of the present invention, there is provided an information processing device arranged in a client terminal connected to a server storing data via a network, wherein the information processing apparatus receives requests from one or a plurality of applications in the client terminal and controls transmission and reception of information to/from the server.

The information processing apparatus may include an authentication information storage unit for storing authentication information of a user for accessing the server, and a request transmission unit for attaching the authentication information of the user of the client terminal to the request based on the request given by the application of the client terminal, and transmits the request to the server.

The request received from the application may include priority information indicating a priority order of transmission to the server, and the request transmission unit may transmit the request to the server based on the priority information.

Moreover, the request transmission unit may cause the request combining unit to combine requests having priority orders lower than the priority information, and may transmit the combined request to the server.

The information processing apparatus may include a request combining unit for generating an aggregate request by combining a plurality of requests when the information processing apparatus receives the plurality of requests to the server from the plurality of applications, and a response splitting unit for splitting an aggregate response, given by the server in reply to the aggregate request, into responses corresponding to the respective requests.

The information processing apparatus may include a response accumulation unit for storing a response transmitted from the server in reply to the request transmitted by the application, and a cache determining unit for managing the response stored in the response accumulation unit. When the cache determining unit may receive a request from the application for obtaining the response accumulated in the response accumulation unit from the server, the cache determining unit may obtain the response from the response accumulation unit and transmits the response to the application.

The response accumulation unit may store expiration date information, until which date the response is stored, for each of the accumulated responses, and the cache determining unit may determine, based on the expiration date information, whether the response to the request transmitted from the application is to be obtained from the response accumulation unit.

The information processing apparatus may include a terminal state monitoring unit for determining at least whether a communication environment of the requesting terminal is good or not and a remaining battery level or a remaining memory capacity. The request transmission unit may transmit the request based on a monitoring result of the requesting terminal provided by the terminal state monitoring unit.

When a predetermined text string is included in requests transmitted from the plurality of applications to the server, the request transmission unit may convert the predetermined text string into information corresponding to the text string and may transmit the requests to the server.

The authentication information storage unit may store authentication information of a plurality of users, and when the request transmission unit may receive the requests from the plurality of applications, the request transmission unit may transmit the requests to a region of the server designated for the user who currently logs in to the client terminal.

The information processing apparatus may include an execution determining unit. When the request is received from the application, the execution determining unit may determine, based on the application and a content of the request, whether the request can be transmitted to the server or not.

According to another embodiment of the present invention, there is provided an information processing method for receiving requests from one or a plurality of applications in a client terminal connected to a server storing data via a network, and controlling transmission and reception of information to/from the server.

According to another embodiment of the present invention, there is provided a computer-readable recording medium storing a program for causing a computer to function as an information processing apparatus for receiving requests from one or a plurality of applications in a client terminal connected to a server storing data via a network, and controlling transmission and reception of information to/from the server.

As described above, the present invention provides an information processing apparatus, an information processing method, and a computer-readable recording medium, capable of controlling transmission and reception of information between a client and a server and reducing the communication traffic between the client and the server.

BRIEF DESCRIPTION OF THE DRAWINGS

FIG. 4 is an explanatory diagram illustrating an exemplary table configuration of a request ID DB;

FIG. 5 is an explanatory diagram illustrating an exemplary table configuration of a cache DB;

FIG. 7 is an explanatory diagram illustrating an exemplary table configuration of a queue DB;

FIG. 8 is an explanatory diagram illustrating an exemplary table configuration of an authentication information DB;

FIG. 12 is an explanatory diagram illustrating an example of a request XML;

FIG. 13 is an explanatory diagram illustrating another example of a request XML;

FIG. 16 is an explanatory diagram illustrating another example of a response XML;

FIG. 17 is an explanatory diagram illustrating an example of an aggregate response XML;

FIG. 18 is an explanatory diagram illustrating an example of a response XML including cache permission information;

FIG. 19 is an explanatory diagram illustrating an example of a response XML including a request ID;

FIG. 20 is an explanatory diagram illustrating an exemplary table configuration of an authentication information DB for managing authentication information for multiple users; and FIG. 21 is an explanatory diagram illustrating an exemplary operation when a request XML is given while multiple users are logged in.

DETAILED DESCRIPTION OF THE EMBODIMENTS

Figure 1:
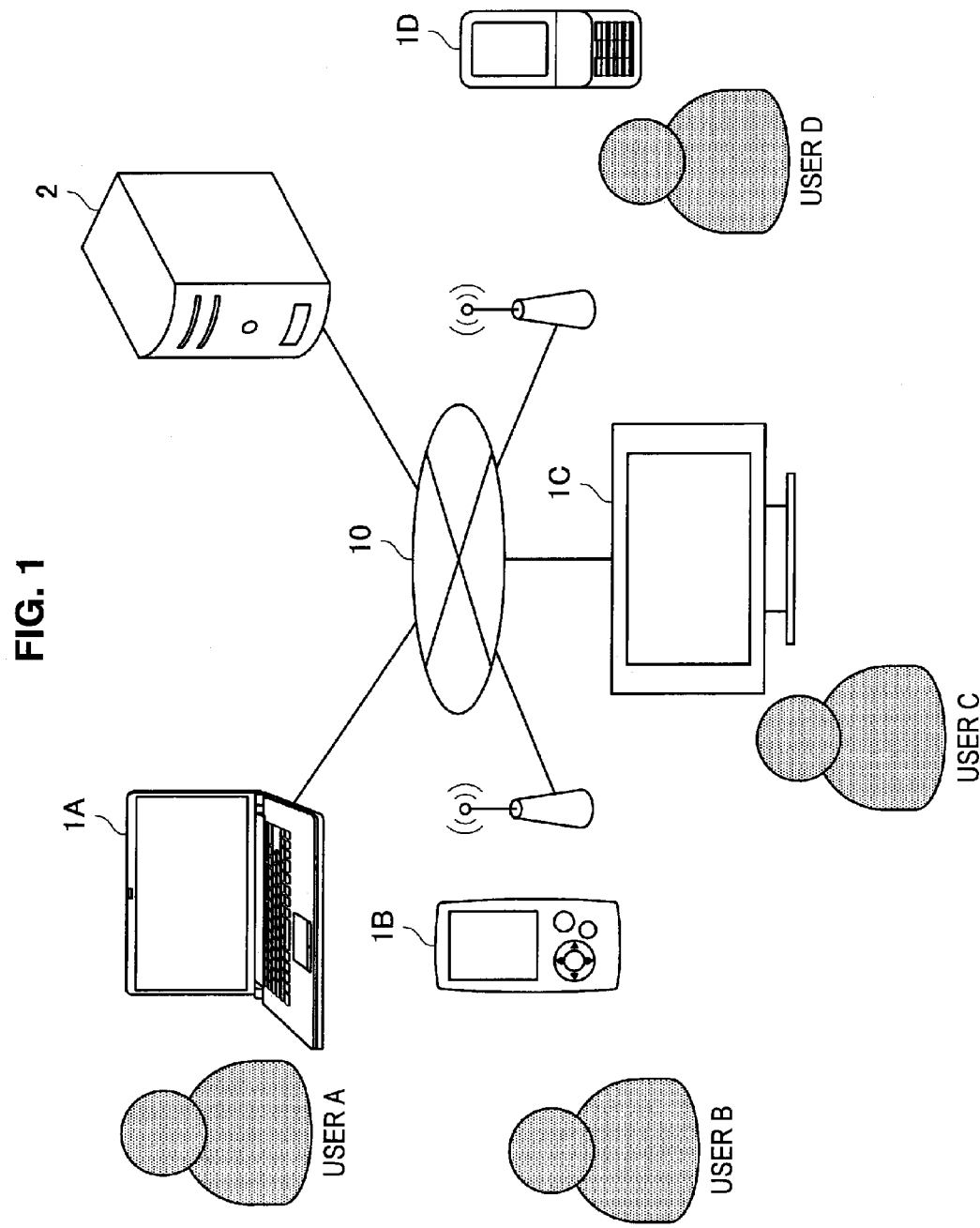
FIG. 1 is a schematic view illustrating a schematic configuration of a system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.
1. Exemplary configuration of system
2. Functional configuration
3. Communication processing between client and server <1. Exemplary Configuration of System>

Figure 2:
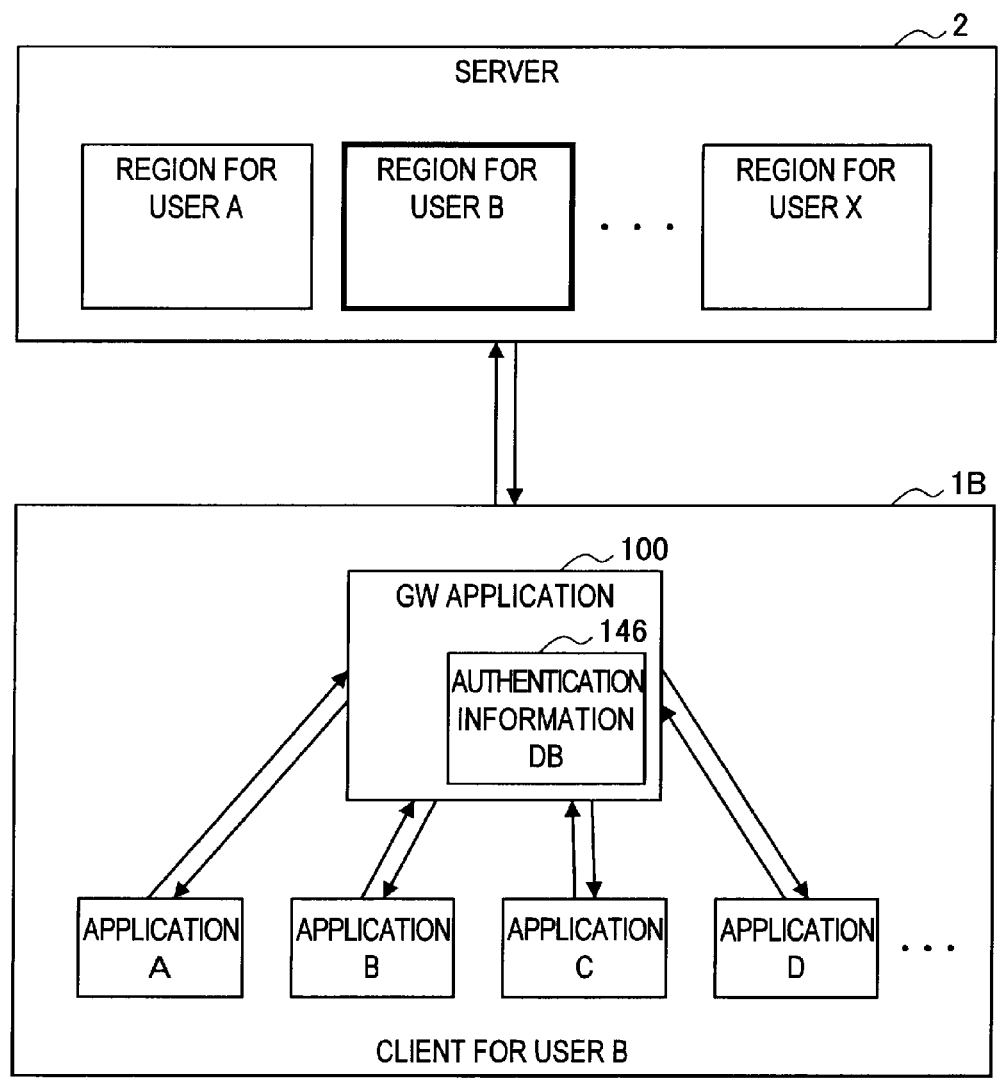
FIG. 2 is an explanatory diagram illustrating an example of a client/server configuration according to the embodiment.

First, a schematic configuration of a system according to an embodiment of the present invention will be explained with reference to FIGS. 1 and 2. FIG. 1 is a schematic view illustrating a schematic configuration of a system according to the present embodiment. FIG. 2 is an explanatory diagram illustrating an example of a client/server configuration according to the present embodiment.

In a system according to the present embodiment, one or a plurality of client terminals 1 and a server 2 for providing data to each client terminal 1 are connected via a network 10. For example, as shown in FIG. 1, a data synchronization system can be structured. In the data synchronization system, four client terminals 1A to 1D and the server 2 are connected. The client terminals 1 and the server 2 may communicate with each other wirelessly or via a wire. Users of the client terminals 1A to 1D may be different users or may be the same user.

The client terminal 1 is an information processing terminal which can obtain desired data from the server 2. For example, the client terminal 1 may be a portable telephone, a communication terminal such as PDA (Personal Digital Assistants), a computer, a television receiver, and the like. The client terminal 1 uses data obtained from the server 2 to achieve functions of applications. The server 2 stores data, and provides data in response to a request given by the client 1.

The client terminal 1 according to the present embodiment is assumed to be a terminal that can be customized for each user by freely adding applications. These applications achieve their functions by communicating with the server. Not only a vender providing the server 2 but also a third vender can develop these applications by using an API (Application Program Interface) provided by the server.

The client terminals 1 and the server 2 according to the present embodiment can communicate with each other as shown in FIG. 2. For example, a plurality of applications such as an application A, an application B, an application C, and an application D are installed to a client terminal 1B of a user B. Each application can use the functions of the server 2 via the network 10 to provide the functions thereof to the client terminal 1B. Accordingly, each application needs to communicate with the server 2 to receive necessary information from the server 2, thus achieving the functions of the application.

The server 2 is a server for providing different services to registered users. The user is to be authenticated by a user account when the user receives a service from the server 2. In this case, the client terminal 1B according to the present embodiment includes a gateway application (hereinafter referred to as "GW application") 100 for accessing the server 2 on behalf of the application. In the GW application 100, an authentication information DB 146 stores authentication information with which the GW application 100 accesses the server 2 on behalf of the applications A to D. For example, in the client terminal 1B used by the user B as shown in FIG. 2, the authentication information DB 146 of the GW application 100 stores the authentication information of the user B.

When the GW application 100 receives a request for accessing the server 2 on behalf of the application from the application, the GW application 100 transmits the authentication information of the user B to the server 2. Then, when the GW application 100 is authenticated by the server 2, the GW application 100 can access a user region B in which the server 2 stores information provided to the user B. In this state, the application can receive information used for execution of the functions from the server 2.

In the present embodiment, the GW application 100 of the client terminal 1 stores authentication information used for communication between the client and the server, and the GW application 100 executes access processing to access the server 2 on behalf of each application. The GW application 100 can also control transmission and reception of information to/from the server 2 in order to efficiently perform communication between the client and the server. Therefore, the communication traffic between the client and the server can be reduced, and the authentication information can be prevented from being compromised to the outside. Subsequently, a configuration of the GW application 100 arranged in the client terminal 1 and communication processing between the client and the server using the GW application 100 will be hereinafter explained.

<2. Functional Configuration>

Figure 3:
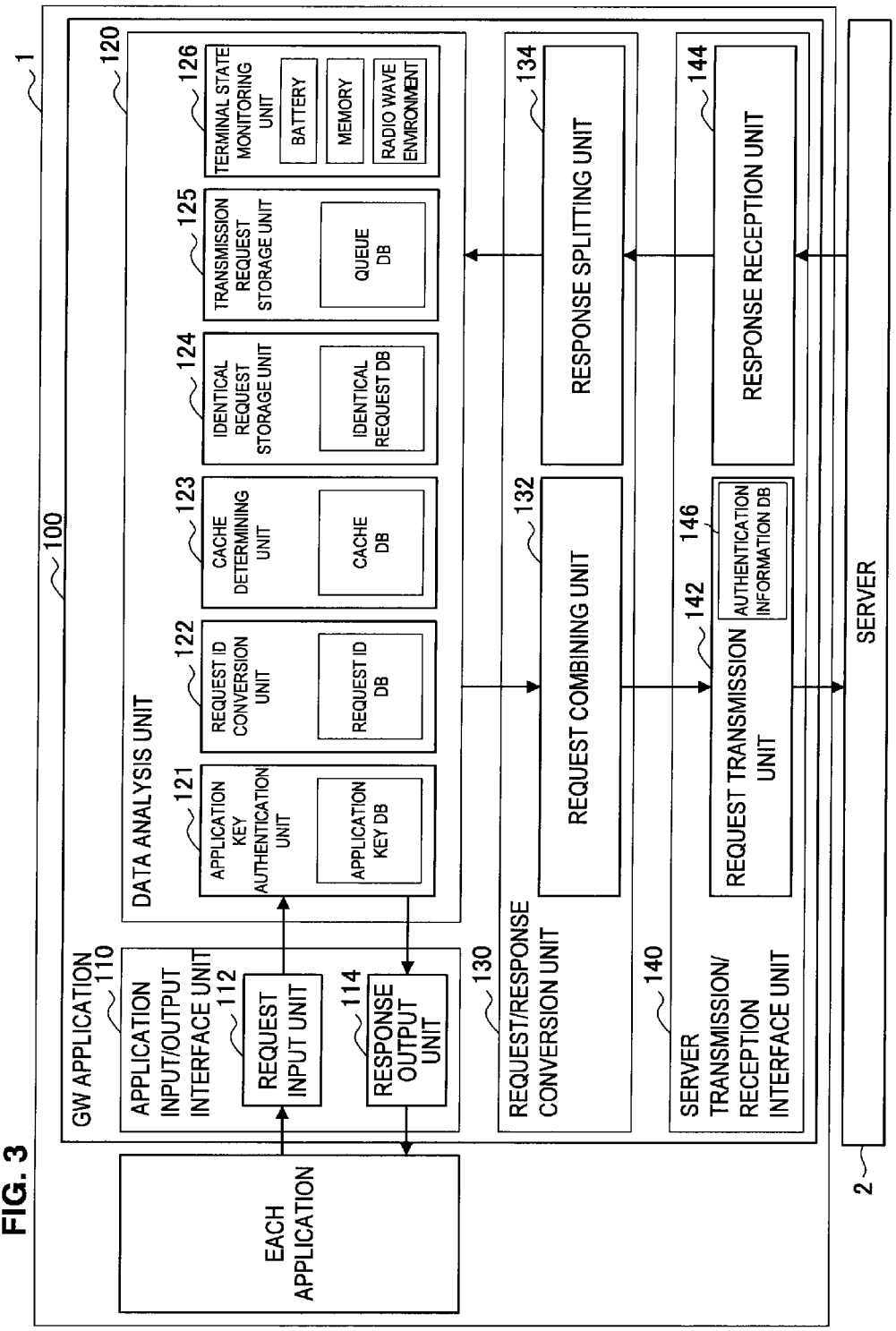
FIG. 3 is a block diagram illustrating a functional configuration of a GW application according to the embodiment.

First, a functional configuration of the GW application 100 according to the present embodiment will be explained with reference to FIG. 3. FIG. 3 is a block diagram illustrating a functional configuration of the GW application 100 according to the present embodiment.

As described above, the GW application 100 accesses the server 2 on behalf of the application installed in the client terminal 1. As shown in FIG. 3, the GW application 100 includes an application input/output interface unit 110, a data analysis unit 120, a request/response conversion unit 130, and a server transmission/reception interface unit 140.

The application input/output interface unit 110 is an interface for transmitting and receiving information between each application and the GW application 100. The application input/output interface unit 110 includes a request input unit 112 and a response output unit 114. The request input unit 112 outputs, to the data analysis unit 120, an access request received from the application to the server 2. The response output unit 114 notifies each application of a response of the server 2 given by the data analysis unit 120.

The data analysis unit 120 generates and processes information communicated between each application and the server 2. The data analysis unit 120 includes an application key authentication unit 121, a request ID conversion unit 122, a cache determining unit 123, an identical request storage unit 124, a transmission request storage unit 125, and a terminal state monitoring unit 126.

The application key authentication unit 121 determines whether a communication for a request sent from each application is accepted or not. When each application transmits a request to the server 2, the application transmits not only the request but also an application key to the GW application 100. The application key is information issued by a developer of the server 2. After approval, the application key and data representing a usable API level are issued to each application. This data is attached with an authentication code by the developer of the server 2, so that those other than the developer of the server 2 cannot obtain the contents of the data.

On the other hand, the GW application 100 can obtain the contents of the data, and can determine whether the application key transmitted from each application is authorized to issue a request to the server 2 by referencing an application key DB. The application key DB is updated by the server 2, and the application key DB stores a list of application keys of applications which are permitted or prohibited to communicate with the server 2. The application key authentication unit 121 checks a security level of data based on information stored in the application key DB, and determines whether the contents of a request sent from an application can be transmitted with the security level of the application having called the GW application 100. When the application key authentication unit 121 determines that the request can be transmitted, the application key authentication unit 121 transmits a request from the application to the transmission request storage unit 125. On the other hand, when the application key authentication unit 121 determines that the request cannot be transmitted, the application key authentication unit 121 notifies a content indicating rejection of request transmission to the application having called the GW application 100 via the application input/output interface unit 110.

The request ID conversion unit 122 converts a request XML representing a request frequently transmitted between the client and the server into a request ID unique to the request XML, and vice versa. The request ID conversion unit 122 stores the request XML and the request ID in the request ID DB in such a manner that the request XML and the request ID are associated with each other. For example, as shown in FIG. 4, the request ID DB can be structured as a table storing a request XML (or ID) 1221 and a request ID 1222.

When the request ID conversion unit 122 receives, from an application, a transmission of a request frequently transmitted between the client and the server, the request ID conversion unit 122 converts the request into a request ID and transmits the request ID to the server 2. With this conversion, the request is transmitted to the server 2 upon being converted into a piece of data having a size smaller than the request XML. Therefore, the communication load can be reduced. On the other hand, when a response transmitted from the server 2 includes a request ID, the request ID conversion unit 122 references the request ID DB, and converts the request ID into a request XML corresponding to the request ID.

The cache determining unit 123 determines whether cache permission information is included in a response transmitted from the server 2. When the cache determining unit 123 determines that the cache permission information is included in the response, the cache determining unit 123 stores the permitted request XML, the response XML, expiration dates of caches thereof to the cache DB. For example, as shown in FIG. 5, the cache DB can be structured as a table storing a permitted request XML (or ID) 1231, a response XML 1232, and an expiration date 1233 of a cache thereof. As described above, response information transmitted from the server 2 is stored to the cache DB. Therefore, when the GW application 100 receives an identical request from an application, the GW application 100 can reference the cache DB and make a response accordingly. In such case, since it is not necessary to communicate with the server 2, the communication load can be reduced.

Figure 6:
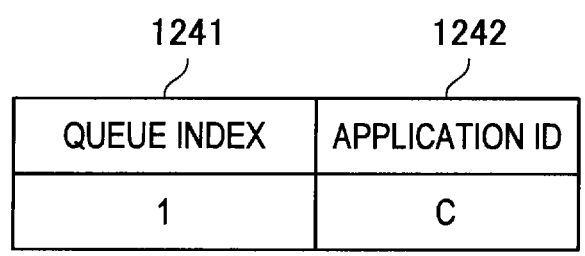
FIG. 6 is an explanatory diagram illustrating an exemplary table configuration of an identical request DB.

When the identical request storage unit 124 receives from an application a request already stored in a queue DB of the GW application 100, the identical request storage unit 124 stores and manages information for identifying the application having transmitted the request. The identical request storage unit 124 associates an application ID of the application having transmitted the request in question with a queue index including information, currently stored in the queue DB, about the transmission of the request identical to the request in question, and stores the application ID and the queue index to an identical request DB. For example, as shown in FIG. 6, the identical request DB can be structured as a table storing a queue index 1241 and an application ID 1242. As described above, the identical request storage unit 124 manages applications transmitting identical requests to the server 2. Therefore, the identical request storage unit 124 prevents identical requests from being transmitted to the server 2 multiple times, thus reducing the communication load.

The transmission request storage unit 125 stores and manages requests transmitted to the server 2. The transmission request storage unit 125 causes the queue DB to store a request which is determined to be ready for transmission by the application key authentication unit 121. For example, as shown in FIG. 7, the queue DB can be structured as a table storing a queue index 1251, an application ID 1252, a priority degree 1253, and a request XML 1254. The queue index 1251 is a number representing an order of requests recorded in the queue DB. The application ID 1252 is an ID, unique to each application, which identifies the application having transmitted the request.

The priority degree 1253 is a value representing an order of priority according to which a request is executed. When the priority degree 1253 has a larger value, the priority degree 1253 means that the request in question is to be executed urgently. When the priority degree is equal to or less than zero, this priority degree means that it is not necessary to execute the request in real time. For example, requests whose queue indexes 1251 are "1", "2", and "3" in FIG. 7 are not necessary to be executed in real time. The priority degree may be set when each application transmits a request. Alternatively, the priority degrees may be set by the applications in advance. Still alternatively, the priority degrees may be determined according to APIs to be executed. The requests stored in the queue DB are transmitted to the server 2 in order based on a determination made by the terminal state monitoring unit 126.

The terminal state monitoring unit 126 checks communication environment of the client terminal 1. For example, the terminal state monitoring unit 126 checks the remaining battery level of the client terminal 1, the used memory size, and the signal strength of wireless communication, and determines the amount of data that can be transmitted to the server 2. Then, the terminal state monitoring unit 126 determines the amount of data to be transmitted to the server 2 according to communication environment of the client terminal 1. Requests within the amount of data determined by the terminal state monitoring unit 126 are selected from the queue DB, and are transmitted to the server 2.

The request/response conversion unit 130 is a functional unit for converting the formats of requests generated by the data analysis unit 120 and responses received from the server 2. The request/response conversion unit 130 includes a request combining unit 132 and a response splitting unit 134. The request combining unit 132 merges requests given by the data analysis unit 120, and outputs the merged request to the server transmission/reception interface unit 140. The response splitting unit 134 receives a response of the server 2 by way of the server transmission/reception interface unit 140, splits the response, and outputs the split responses to the data analysis unit 120.

The server transmission/reception interface unit 140 is an interface for transmitting and receiving information between the server 2 and the GW application 100. The server transmission/reception interface unit 140 includes a request transmission unit 142 and a response reception unit 144. The request transmission unit 142 transmits a request given by the request/response conversion unit 130 to the server 2. Further, the request transmission unit 142 has an authentication information DB 146 storing authentication information of users. The response reception unit 144 outputs a response received from the server 2 to the request/response conversion unit 130.

For example, as shown in FIG. 8, the authentication information DB 146 arranged in the server transmission/reception interface unit 140 can be structured as a table for storing a user ID 1461, a client ID 1462, a password 1463, and a server URL 1464. The user ID 1461 is an ID unique to each user for identifying the user. The client ID 1462 is an ID for identifying the client terminal 1 determined by the server 2. The password 1463 is determined by the server 2, and is information associated with the client ID. The server URL 1464 is a URL with which the client terminal 1 executes an API with respect to a region of the server 2 designated for the client terminal 1. The information stored in the authentication information DB 146 is uniformly managed by the GW application 100, and is stored in a format that cannot be referenced by the applications of the client terminal 1 except for the GW application.

As described above, the authentication information of each application is not stored in the application itself but is stored in the GW application 100. Therefore, each application cannot access the server 2 without relying on the GW application 100.

The functional configuration of the GW application 100 according to the present embodiment has been hereinabove explained.

<3. Communication Processing Between Client and Server>

Figure 9:
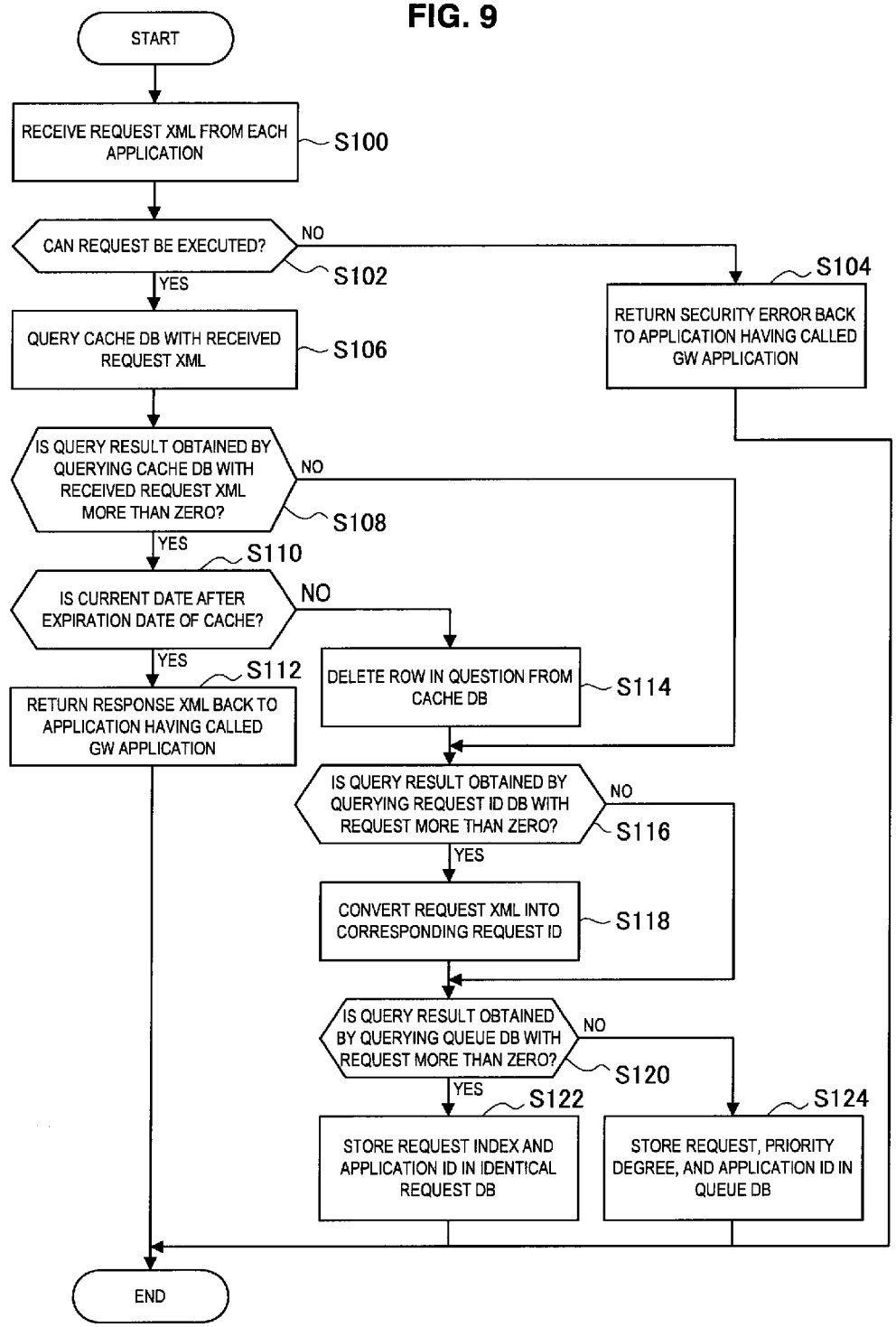
FIG. 9 is a flowchart illustrating exchange of information between an application and a GW application when the GW application receives a request from the application.
Figure 10A:
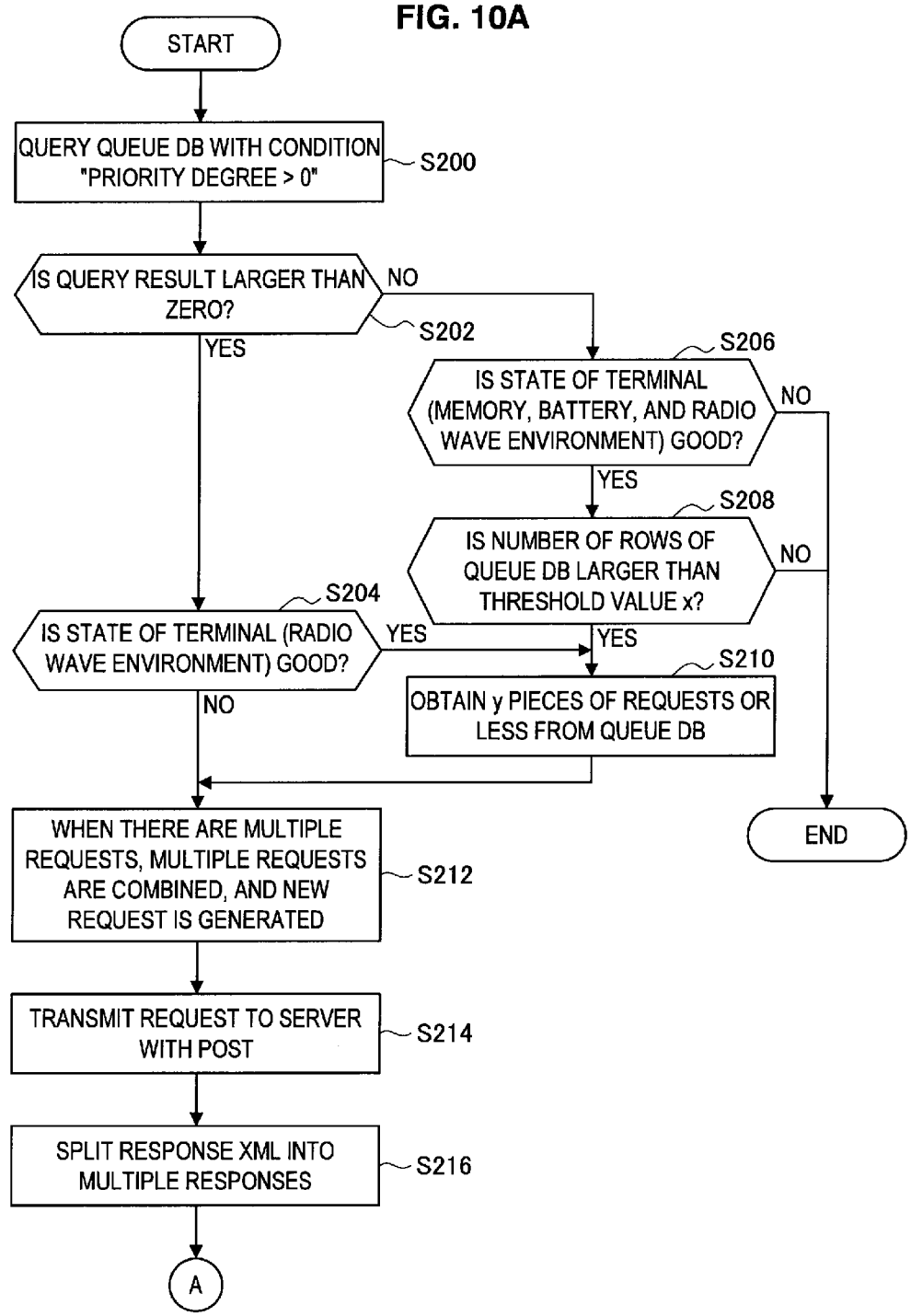
FIG. 10A is a flowchart illustrating exchange of information between the GW application and a server when the GW application receives a request from an application.
Figure 10B:
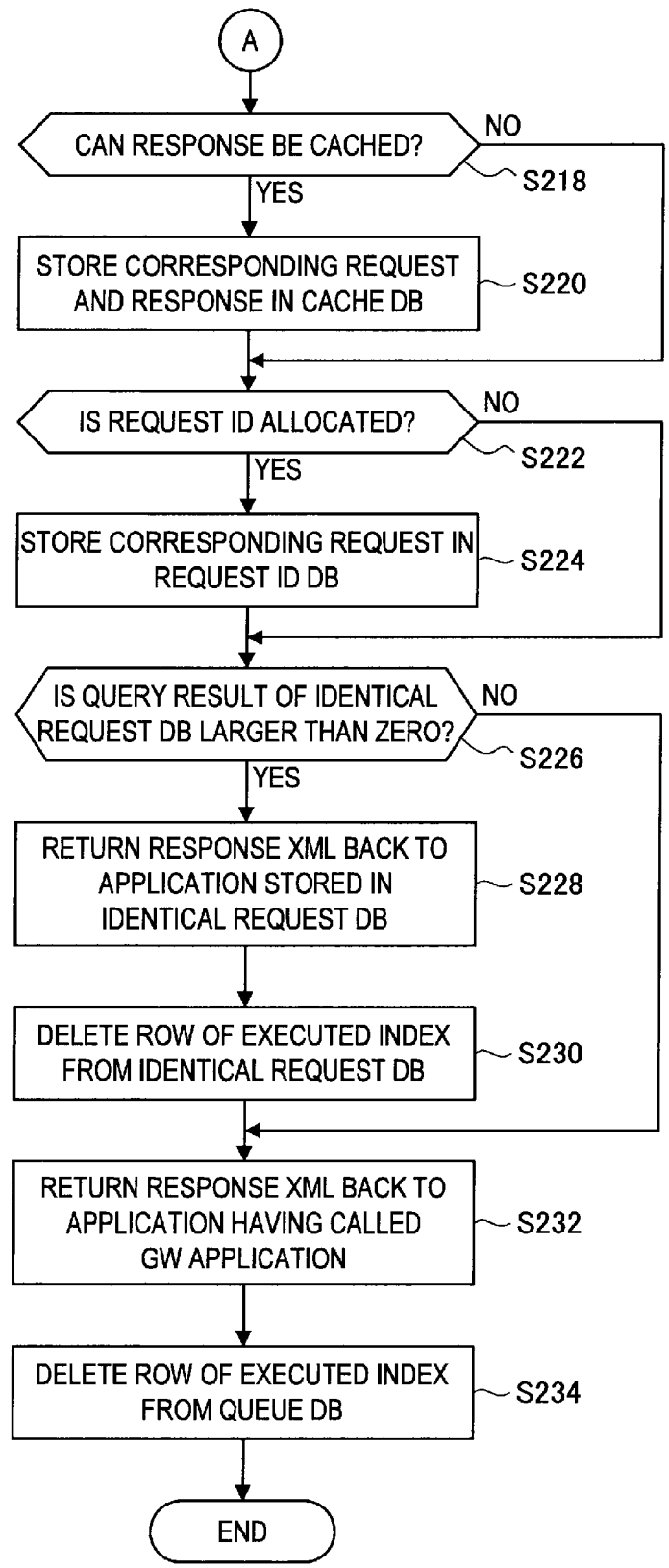
FIG. 10B is a flowchart illustrating exchange of information between the GW application and a server when the GW application receives a request from an application.
Figure 11:
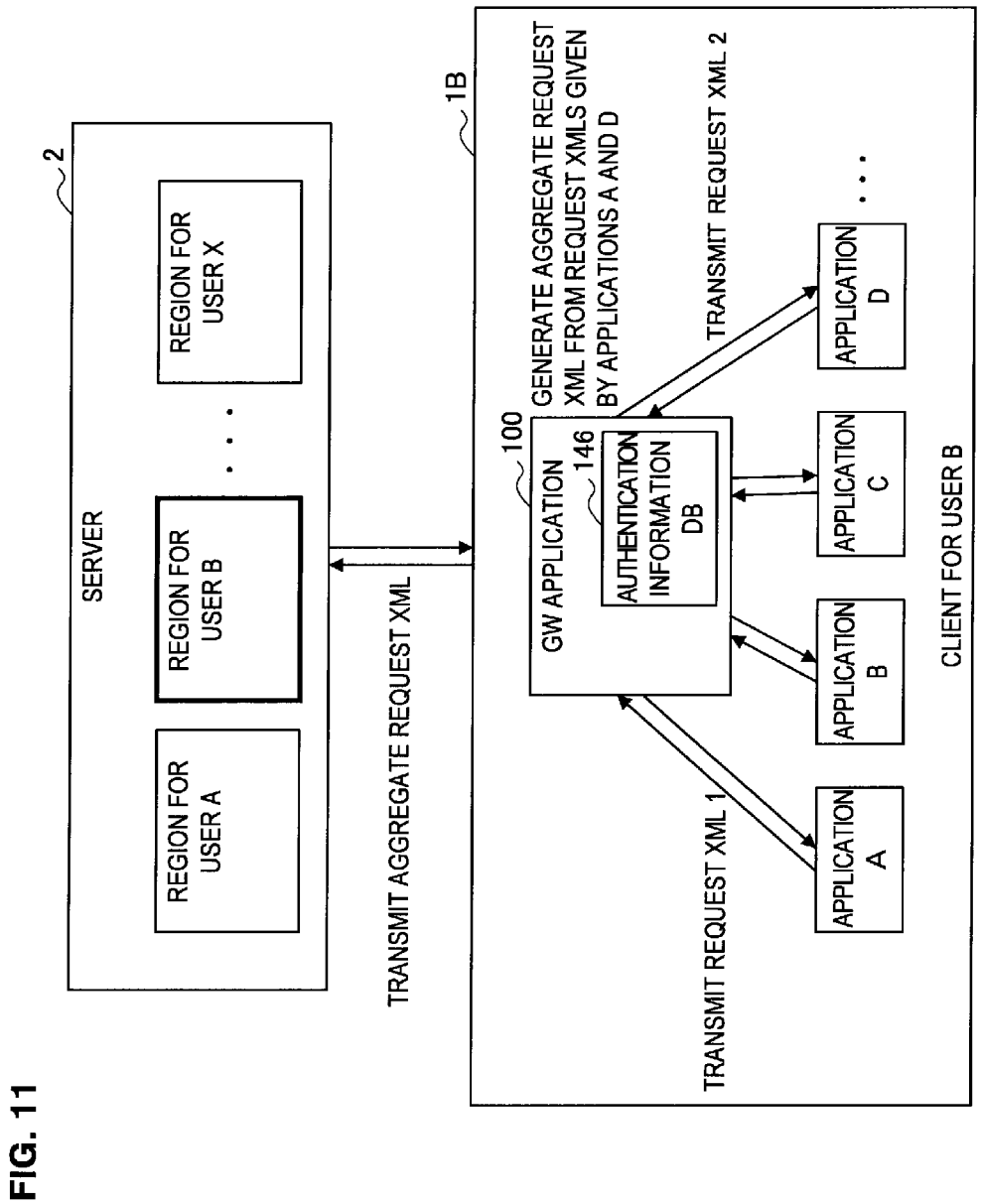
FIG. 11 is an explanatory diagram illustrating an exemplary operation of the GW application when the GW application receives requests from a plurality of applications.

Subsequently, communication processing between the client and the server by way of the GW application 100 according to the present embodiment will be explained with reference to FIGS. 9 to 11. FIG. 9 is a flowchart illustrating exchange of information between an application and the GW application 100 when the GW application 100 receives a request from the application. FIGS. 10A and 10B are flowcharts each illustrating exchange of information between the GW application 100 and the server 2 when the GW application receives a request from an application. FIG. 11 is an explanatory diagram illustrating an exemplary operation of the GW application 100 when the GW application receives requests from a plurality of applications.

[Information Processing Performed by Application and GW Application]

The communication processing between the client and the server shown above is processing which is executed by an application installed in the client terminal 1 in order to provide functions by cooperating with the server 2. This processing is initiated as follows. First, as shown in FIG. 9, each application transmits a request for the server 2 to the GW application 100 in order to execute an API of the server 2. The GW application 100 receives the request from each application (step S100). The API of the server 2 is executed as follows. A client ID and a password are set as a header to a client URL, and the API of the server 2 receives an XML text (request XML) constituted by an API name of the server 2 and an argument thereof which the user of the client terminal 1 wants to use. Such request XML is generated by each application, and can be written as shown in FIGS. 12 and 13, for example.

For example, the request XML as shown in FIG. 12 notifies an API name "application 1" and an argument x, which are to be executed. On the other hand, the request XML shown in FIG. 13 notifies an API name "application 2" and arguments y, z, which are to be executed. The request may be a text in an XML format as explained above, or may use other data-exchange formats.

For example, in the example shown in FIG. 11, the processing of step S100 corresponds to processing for transmitting a request XML to the GW application 100 from applications of an application group of a client terminal (for example, the client terminal 1B of the user B). The request input unit 112 of the GW application 100 having received the request XML transmits the request XML to the application key authentication unit 121.

Subsequently, the application key authentication unit 121 determines whether the received request XML is to be transmitted to the server 2 (step S102). The application key authentication unit 121 determines, based on the application key received from the application and based on the content of the request, whether the application having transmitted the request is allowed to communicate the request or not. When the request to be transmitted is determined to be sent from an application that does not satisfy a necessary security level, the application key authentication unit 121 determines that the request cannot be transmitted to the server 2, and the application key authentication unit 121 notifies a security error to the application having transmitted the request (step S104).

On the other hand, when the application key authentication unit 121 checks the security level of data received from the application, and determines that the request can be transmitted with the security level of the application having transmitted the request based on the content of the request, the application key authentication unit 121 causes the cache determining unit 123 to determine whether the content of the request (request XML) is stored in the cache DB or not. In other words, the cache determining unit 123 queries the cache DB with the request XML notified from the application key authentication unit 121 (step S106), and determines whether the cache DB has response information of the request XML (step S108).

When the cache determining unit 123 determines that the cache DB has response information of the request XML in step S108, the cache determining unit 123 checks an expiration date of a cache corresponding to the request XML, and determines whether the current date is after the expiration date (step S110). When the cache determining unit 123 determines that the current date is not after the expiration date of the cache in step S110, the cache determining unit 123 causes the response output unit 114 to transmit the response information (response XML) in reply to the request XML to the application having transmitted the request (step S112).

On the other hand, when the current date is determined to be after the expiration date of the cache in step S110, the cache determining unit 123 accesses the server 2 again to obtain information. In this case, first the cache determining unit 123 deletes cache information corresponding to the request XML from the cache DB (step S114). Then, in step S106, the request ID conversion unit 122 determines whether the request ID DB has a request XML corresponding to the request XML in question, based on a result obtained by querying the request ID DB of the request ID conversion unit 122 with the request XML (step S116).

When the request ID DB is determined to have the corresponding request XML, the request ID conversion unit 122 converts the request XML into a request ID (step S118). On the other hand, the request ID DB is determined not to have the corresponding request XML, the request ID conversion unit 122 proceeds to the processing of step S120 without converting the request XML into the request ID. In step S120, the transmission request storage unit 125 queries the queue DB with the request XML. As a result, a determination is made as to whether an identical request is already stored in the queue DB or not.

When the queue DB is determined to have a request XML identical to the request XML in question in step S120, the transmission request storage unit 125 causes the identical request storage unit 124 to store, in the identical request DB, the queue index representing transmission processing of the request XML in question and the application ID of the application from which the request XML in question is read (step S122). On the other hand, when the queue DB is determined not to have a request XML identical to the request XML in question in step S120, the transmission request storage unit 125 stores the request, the priority degree, and the application ID to the queue DB (step S124).

Information exchange between the application and the GW application 100 when the GW application 100 receives the request from the application has been hereinabove explained.

[Information Processing Performed by the Server and the GW Application]

Subsequently, information exchange between the GW application 100 and the server 2 will be explained with reference to FIGS. 10A and 10B. First, the GW application 100 queries the queue DB storing the requests which are to be transmitted to the server 2, so as to identify requests whose priority degrees are larger than zero (step S200). Step S200 is performed to extract requests to be executed in real time, and preferentially transmit those requests over other requests. Then, a determination is made as to whether there is any request whose priority degree is larger than zero (step S202). When it is determined that there is a request whose priority degree is larger than zero, the terminal state monitoring unit 126 determines whether the state of communication environment of the client terminal 1 is good or not (step S204).

In step S204, radio wave environment serving as the state of communication environment is checked. When the radio wave environment is good, the probability of communication error is low even though the amount of transmission data is large. Accordingly, when the radio wave environment is good, y pieces of requests or less are obtained from the queue DB (step S210), and the requests are adopted as transmission candidates to the server 2. On the other hand, when the radio wave environment is not good, only the requests having high priority degrees are adopted as transmission candidates to the server 2.

When no request having a high priority degree is extracted back in step S202, the terminal state monitoring unit 126 checks whether communication environment of the client terminal 1 is good or not (step S206). In this case, the terminal state monitoring unit 126 checks the used memory size, the remaining battery level, and the radio wave environment, which serve as the state of communication environment. When communication is performed while the free memory size is small, the user would feel uncomfortable operational feeling in operating the client terminal 1. When the remaining battery level is insufficient, it is preferable to avoid low-priority communication to save the battery. Accordingly, requests having low priority degrees are not transmitted to the server 2, and the processing is terminated, so as to preferentially maintain the operational feeling in operating the client terminal 1 and save the battery. On the other hand, when the communication environment is good, the number of requests stored in the queue DB and the number of stored requests at which transmission of the requests is started (threshold value x) are compared to determine whether transmission of the requests is to be started or not (step S208).

Usually, a plurality of requests are transmitted at a time. Therefore, when the number of requests stored in the queue DB becomes more than the predetermined number (threshold value x), transmission of the requests to the server 2 is started. In other words, in step S208, a determination is made as to whether the queue DB stores as many requests as the number of requests at which transmission of the requests is started. When the number of requests stored in the queue DB is equal to or less than the threshold value x in step S208, the requests are not transmitted to the server 2, and the processing is terminated. On the other hand, when the number of requests stored in the queue DB is more than the threshold value x, y pieces of requests or less are obtained from the queue DB, and are adopted as transmission candidates (step S210).

The number of requests y obtained from the queue DB at a maximum in step S210 is the maximum number of requests merged in step S212 explained later. The transmission request storage unit 125 obtains y pieces of requests from among all the requests stored in the queue DB, and outputs the obtained requests to the request combining unit 132.

The threshold value x used in step S208 and the number of requests y used in step S210 may be changed as necessary according to user setting or the state of the terminal. Therefore, the communication state can be optimized according to the communication environment and the states of the client terminal 1 and the server 2. When the state of the radio wave is bad, or there is a large amount of data of requests having high priority degrees, requests having low priority degrees may be excluded from communication candidates in order to reduce the probability of communication errors of the requests having high priority degrees.

When the request combining unit 132 receives one or more requests stored in the queue DB from the transmission request storage unit 124, the request combining unit 132 determines whether a plurality of requests have been received or not. Then, when a plurality of requests have been received, these requests are combined, and a new request is generated (step S212). For example, when there is only one request which is to be transmitted to the server 2, a request XML such as those shown in FIGS. 12 and 13 is transmitted to the server 2 without conversion. Alternatively, it is converted into a request ID, and the request ID is transmitted to the server 2. On the other hand, when there are a plurality of requests which are to be transmitted to the server 2, the hierarchy structure of XML may be used to write a plurality of APIs in one request XML and transmit the request XML to the server with only one communication.

Figure 14:
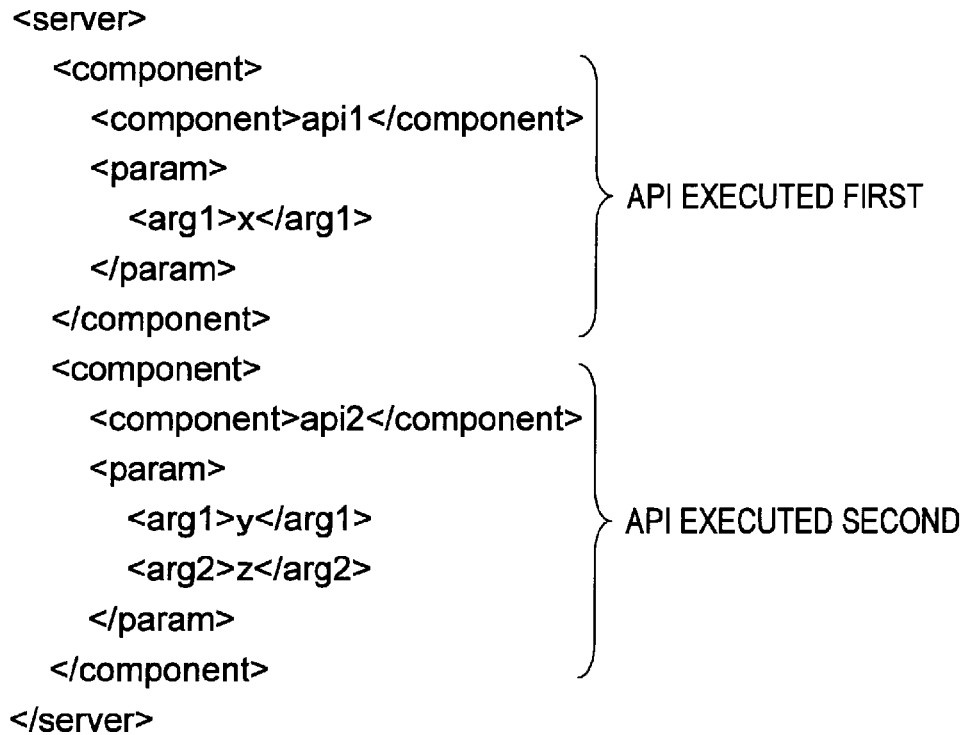
FIG. 14 is an explanatory diagram illustrating an example of an aggregate request XML.

For example, two request XMLs shown in FIGS. 12 and 13 are transmitted to the server 2. At this occasion, for example, the two request XMLs may be written as shown in FIG. 14, in which the request XML of FIG. 12 is written as the API executed first, and the request XML of FIG. 13 is written as the API executed subsequently. Therefore, the number of communications with the server 2 can be reduced. When a plurality of requests are transmitted to the server 2, the request combining unit 132 generates a request XML (aggregate request XML) by combining these request XMLs, and outputs the generated request XML to the request transmission unit 142. Then, the request transmission unit 142 transmits (POST) the request to the server 2 (step S214).

Thereafter, when the server 2 receives the request, the server 2 analyzes the request XML to find a command to be executed, and executes the command with respect to the user region indicated by the client URL. Then, the server 2 transmits an XML-format text representing this execution result as a response XML to the response reception unit 144 of the GW application 100 of the client terminal 1. The response reception unit 144 outputs the response XML to the response splitting unit 134. When the response XML includes a response for a plurality of request XMLs, the response splitting unit 134 splits the response XML into a plurality of responses (step S216).

Figure 15:
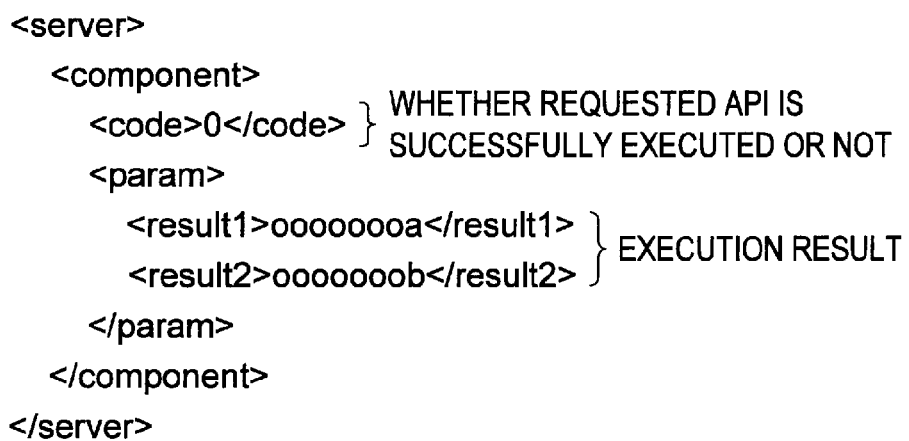
FIG. 15 is an explanatory diagram illustrating an example of a response XML.

In this case, for example, the response XML transmitted from the server 2 is written as shown in FIGS. 15 and 16. The response XML shown in FIG. 15 is a response to the request XML of FIG. 12, and the response XML shown in FIG. 16 is a response to the request XML of FIG. 13. The response XML includes information as to whether the API requested by the application is successfully executed or not, and also includes the execution result. For example, when an aggregate request XML generated by combining a plurality of request XMLs is transmitted to the server 2 as shown in FIG. 14, a response XML including responses to the request XMLs as shown in FIG. 17 is received. The response XML of FIG. 17 includes information as to whether the first API is successfully executed or not and the execution result thereof, and also includes information as to whether the second API is successfully executed or not and the execution result thereof. As described above, when the response XML includes the response to the plurality of request XMLs, the response splitting unit 134 splits the response XML into individual response XMLs in reply to the respective request XMLs. The split response XMLs are output to the data analysis unit 120.

The response XML received from the server 2 includes not only the execution result of the API but also, for example, information as to whether the response to the request can be cached or not and information as to whether a request ID can be attached to the request XML or not. The data analysis unit 120 analyzes the above information to execute processing for reducing the communication load of the server 2 when the GW application 100 subsequently receives a request from the application.

First, the cache determining unit 123 of the data analysis unit 120 determines whether the response to the request can be cached or not (step S218). The cache determining unit 123 checks whether the response XML includes permission information for allowing caching. When the response XML is determined to include the permission information, the response XML is cached. When the response XML is determined not to include the permission information, the response XML is not cached. FIG. 18 illustrates an example of a response XML including cache permission information. As shown in FIG. 18, the cache permission information is, for example, an expiration date of a cache. If this expiration date is included in the response XML, this means that caching is permitted.

As described above, the cache determining unit 123 having received the response XML including the cache permission information causes the cache DB to store the request XML which is allowed to be cached, the response XML, and the expiration date of the cache (see FIG. 5) (step S220). At this occasion, in a case where the request for the response XML is not written in XML format but is given as the request ID, the request ID DB (FIG. 4) is referenced, and the request ID is converted into a request XML. Then, the converted request XML is recorded to the cache DB. In a case where the response XML is determined not to include the cache permission information in step S218, caching is not permitted. Accordingly, the response XML to this request XML is not recorded to the cache DB.

Subsequently, like step S218, the request ID conversion unit 122 determines whether the response XML given by the server 2 includes a request ID or not (step S222). The request ID is information used instead of the request XML frequently exchanged between the application and the server 2 in order to reduce the communication load with the server 2. When the request ID conversion unit 122 determines that the response XML given by the server 2 includes a request ID, the request ID conversion unit 122 records the request ID and the request XML corresponding to the request ID to the request ID DB (see FIG. 4) (step S224).

FIG. 19 shows an example of a response XML including a request ID. As shown in FIG. 19, the request ID is written in the response XML as information specified by the server 2. As described above, the request ID conversion unit 122 records the request ID included in the response XML to the request ID DB. Therefore, when the request ID conversion unit 122 thereafter receives the same request from the application, the request ID conversion unit 122 can convert the request into the request ID and transmit the request ID to the server 2. When the response XML is determined not to include the request ID in step S222, there is no request ID corresponding to the request XML, and the request ID is not recorded to the request ID DB.

Further, the identical request storage unit 124 determines whether there is another client terminal 1 that transmits the same request as the request XML (step S226). The identical request storage unit 124 references the identical request DB to determine whether the identical request DB has a queue index associated with transmission processing of the request XML. Then, when the identical request DB has the same queue index, the application ID associated with the queue index is added to an output destination of the response XML (step S228). Then, the identical request storage unit 124 removes the executed index from the identical request DB (step S230).

When the identical request storage unit 124 determines that there is no other client terminal 1 that transmits the same request as the request XML in step S226, the processings of steps S228 and S230 are not performed, but the processing of step S232 is executed.

When the analysis of the response XML in steps S218 to S230 is finished, the data analysis unit 120 causes the response output unit 114 to transmit the response XML to the application having transmitted the request (step S232). Thereafter, the transmission request storage unit 125 removes the executed queue index and information associated with the executed queue index from the queue DB (step S234).

As described above, the client and the server communicate with each other as shown in FIGS. 9 to 11. Therefore, in the past, when the application installed in the client provides functions using the API of the server needing authentication information for each user, it is necessary for each application to prompt the user to input the authentication information and to store the authentication information. This forces the user to perform cumbersome operation, and there are many portions for storing the authentication information of the server. Moreover, the user has to give the authentication information of the server to the third vender, which causes a security issue. In addition, it is inefficient for multiple applications to separately communicate with the same server. Accordingly, this increases the load and the communication cost of the server, and affects the life of the battery of the client.

To alleviate the above issues, the GW application according to the present embodiment may be used, so that the server can provide the API without compromising the authentication information of the user to the third vender. Further, the contents of the requests within the client terminal can be combined to save session resources and reduce the communication traffic of the server. The user can also enjoy advantages in that the authentication information is protected, it is not necessary to log in to the server every time the user uses a supported application, and the operation is carried out according to the battery and the memory of the terminal. Therefore, the user can comfortably use the applications. Since the communication traffic transmitted from the client is reduced, the user can save the communication charge. The third vender who generates the application can also enjoy advantages in that the third vender does not have to study codes for communicating with the server and codes storing the authentication information, and therefore, the third vender can easily develop the application.

Normally, processings for obtaining a request from the queue DB and communicating with the server 2 are processed in parallel with multi threads. This is because a single thread cannot handle a situation where the GW application 100 receives a request having a high priority degree while the GW application 100 is transmitting many combined requests to the server 2 at a time. As the number of threads increases, the performance improves but the memory and the battery are greatly consumed. Therefore, the GW application 100 can dynamically change the number of threads according to the remaining memory capacity and the used battery level of the client terminal 1.

Although applications except for the GW application 100 cannot reference the data stored in the authentication information DB of the GW application 100, each application may want to input the data into a request XML. In such case, the GW application 100 provides each application with a certain text string that is automatically replaced with data of the authentication information DB 146 by the GW application 100. When each application makes a request XML using data of the authentication information DB 146, the application writes the predetermined text string at a portion which is to be replaced with the data of the authentication information DB 146. When the GW application 100 receives the request, the request transmission unit 142 replaces the text string with the desired data of the authentication information DB 146. Therefore, the data of the authentication information DB 146 can be used by each application, while the data of the authentication information DB 146 are not compromised by applications except for the GW application 100.

Further, as shown in FIG. 20, in the GW application 100, not only the authentication information of one user but also authentication information of many users can be managed in the authentication information DB 146. FIG. 20 is an exemplary table configuration of the authentication information DB 146 for managing authentication information for multiple users. Further, the state of each user, e.g., log in and log off, can be switched by an API provided by the GW application 100.

Figure 21:
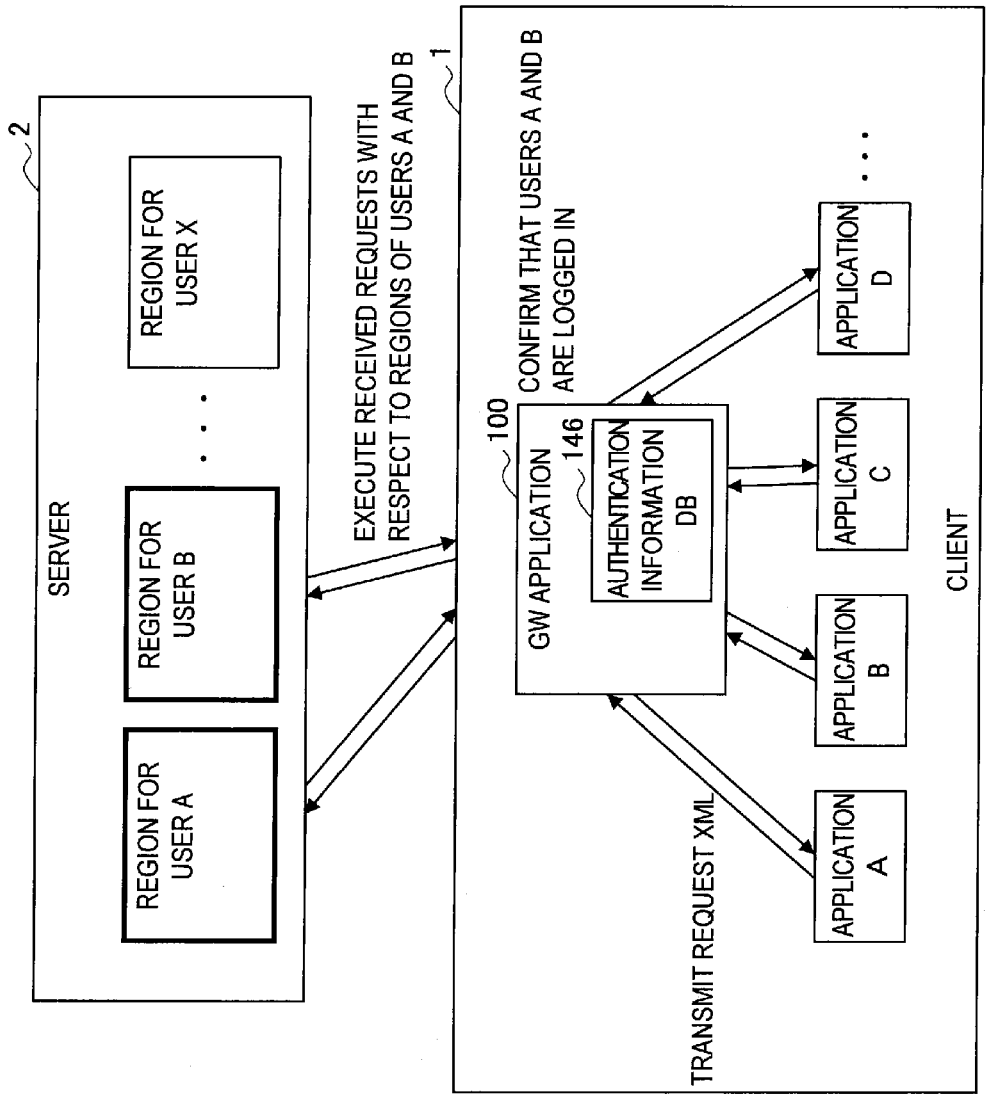

FIG. 21 is an exemplary operation when a request XML is given while multiple users are logged in. As shown in FIG. 21, when the GW application 100 receives a request XML from each application, the GW application 100 uses the authentication information of the currently logged-in user to transmit the request to the server. In a case where the GW application 100 is configured such that multiple users are logged in, the GW application 100 performs processings as follows. When the GW application 100 receives a request XML from each application, the GW application 100 uses each piece of authentication information and executes the API indicated by the request XML with respect to the region of each user in the server 2. The GW application 100 combines responses into one response XML, and returns the response XML back to the application having transmitted the request.

It should be understood by those skilled in the art that various modifications, combinations, sub-combinations and alterations may occur depending on design requirements and other factors insofar as they are within the scope of the appended claims or the equivalents thereof.

For example, in the above embodiment, the GW application 100 attaches authentication information to a request given by an application and transmits the request with the authentication information to the server 2. However, the present invention is not limited to this example. Some of the APIs of the server 2 requested by the application in the client terminal 1 do not need authentication information of users. For example, the GW application 100 may combine requests of multiple applications given by multiple users, and may execute APIs with respect to a common region of the server 2 instead of the private regions of the users. Therefore, the GW application 100 of the present invention controls communication so as to efficiently communicate with the server 2 upon combining requests from multiple applications.

The present application contains subject matter related to that disclosed in Japanese Priority Patent Application JP 2010-033550 filed in the Japan Patent Office on Feb. 18, 2010, the entire content of which is hereby incorporated by reference.

What is claimed is:

1. An information processing apparatus comprising:
circuitry configured to:
select one authentication information among a plurality of authentication information stored in a memory according to a request from an application, each authentication information corresponding to different application information, the authentication information being issued by a developer,
add the selected authentication information to the request,
control transmitting the request having the authentication information to a server used to perform log in or log out from the server,
monitor a communication environment of the information processing apparatus and a remaining battery level or a remaining memory capacity of the information processing apparatus, and
transmit the request based on the monitoring result of the communication environment and the remaining battery level or remaining memory capacity of the information processing apparatus;
wherein the memory stores a response transmitted from the server in reply to the request transmitted by the application,
the memory stores expiration information for each accumulated response, and
the circuitry determines, based on the expiration information, whether the response to the request transmitted from the application is to be obtained from the memory.

2. The information processing apparatus according to claim 1, wherein the authentication information is authentication information of a user of a client terminal and the application is an application of the client terminal.

3. The information processing apparatus according to claim 2, wherein the request received from the application includes priority information indicating a priority order of transmission to the server, and the circuitry transmits the request to the server based on the priority information.

4. The information processing apparatus according to claim 1, wherein the circuitry is further configured to:
generate an aggregate request by combining a plurality of requests when the information processing apparatus receives the plurality of requests to the server from the plurality of applications, and
split an aggregate response, given by the server in reply to the aggregate request, into responses corresponding to the respective requests.

5. The information processing apparatus according to claim 4, wherein the circuitry combines requests having priority orders lower than the priority information, and transmits the combined request to the server.

6. The information processing apparatus according to claim 1, wherein
the circuitry manages the response stored in the memory, and
the circuitry transmits the response to the application when the circuitry receives a request from the application for obtaining the response accumulated in the server and determines that the response is to be obtained from the memory.

7. The information processing apparatus according to claim 1, wherein when a predetermined text string is included in requests transmitted from the plurality of applications to the server, the circuitry converts the predetermined text string into information corresponding to the text string and transmits the requests to the server.

8. The information processing apparatus according to claim 1, wherein
the memory stores authentication information of a plurality of users, and
when the circuitry receives the requests from the plurality of applications, the circuitry transmits the requests to a region of the server designated for the user who currently logs in to the client terminal.

9. The information processing apparatus according to claim 1, wherein, when the request is received from the application, the circuitry determines, based on the application and a content of the request, whether the request can be transmitted to the server or not.

10. The information processing apparatus of claim 1, wherein the circuitry determines whether or not to transmit the request based on the monitoring result of the communication environment and the remaining battery level or remaining memory capacity.

11. A method implanted by an information processing apparatus, the method comprising:
selecting, via circuitry, one authentication information among a plurality of authentication information stored in a memory according to a request from an application, each authentication information corresponding to different application information, the authentication information being issued by a developer;
adding, via the circuitry, the selected authentication information to the request; and
controlling, via the circuitry, transmitting the request having the authentication information to a server used to perform log in or log out from the server;
monitoring a communication environment of the information processing apparatus and a remaining battery level or a remaining memory capacity of the information processing apparatus; and
transmitting the request based on the monitoring result of the communication environment and the remaining battery level or remaining memory capacity of the information processing apparatus;
wherein the memory stores a response transmitted from the server in reply to the request transmitted by the application,
the memory stores expiration information for each accumulated response, and
the circuitry determines, based on the expiration information, whether the response to the request transmitted from the application is to be obtained from the memory.

12. A non-transitory computer-readable medium having computer-readable instructions stored thereon which when executed by a computer cause the computer to perform a method comprising:
selecting one authentication information among a plurality of authentication information stored in a memory according to a request from an application, each authentication information corresponding to different application information, the authentication information being issued by a developer;
adding the selected authentication information to the request; and
controlling transmitting the request having the authentication information to a server used to perform log in or log out from the server;
monitoring a communication environment of the information processing apparatus and a remaining battery level or a remaining memory capacity of the information processing apparatus; and
transmitting the request based on the monitoring result of the communication environment and the remaining battery level or remaining memory capacity of the information processing apparatus;
wherein the memory stores a response transmitted from the server in reply to the request transmitted by the application,
the memory stores expiration information for each accumulated response, and
the circuitry determines, based on the expiration information, whether the response to the request transmitted from the application is to be obtained from the memory.

* * * * *